United States Patent [19]

Adams

[11] Patent Number: 4,738,462
[45] Date of Patent: Apr. 19, 1988

[54] TOOL FOR MOVING A FIFTH WHEEL

[76] Inventor: W. F. Adams, 4197 Jackson Rd., Covington, Ga. 30209

[21] Appl. No.: 904,956

[22] Filed: Sep. 8, 1986

[51] Int. Cl.⁴ .............................................. B62D 53/08
[52] U.S. Cl. ..................................... 280/407; 254/119; 280/430; 280/441; 298/20 A
[58] Field of Search ............... 280/407 C, 412, 423 A, 280/430, 433, 438 R, 438 A, 441, 478 B; 254/119, 129, 130; 298/14, 20 A, 22 AE

[56] References Cited

U.S. PATENT DOCUMENTS

| | | | |
|---|---|---|---|
| 2,807,477 | 9/1957 | Tuso, Jr. .......................... | 280/438 R |
| 2,845,281 | 7/1958 | Holder et al. .................... | 280/478 B |
| 2,933,052 | 4/1960 | Mellaim .......................... | 280/433 X |
| 3,181,889 | 5/1965 | Harris .............................. | 280/438 R |
| 3,479,055 | 11/1969 | Cunha et al. ..................... | 280/407 |
| 3,861,709 | 1/1975 | Mulcahy et al. .................. | 280/407 |
| 4,429,892 | 2/1984 | Frampton et al. ................ | 280/407 |
| 4,482,166 | 11/1984 | Van Antwerp ................... | 280/478 B |

Primary Examiner—John J. Love
Assistant Examiner—Charles R. Watts
Attorney, Agent, or Firm—Jones, Askew & Lunsford

[57] ABSTRACT

A tool for adjusting the position of a fifth wheel upon a tractor trailer assembly, in which a leverage arm is provided in combination with a pivotally mounted push and pull bar. The leverage arm is pivotally secured to a first mounting platform and extends the distance between the first mounting platform and a second mounting platform. Upon action of the leverage arm from outside of the second mounting platform, the leverage arm exerts a radial force against a pivotally connected push and pull bar. The push and pull bar is attached to the fifth wheel in such a manner as to translate the radial action of the leverage arm into a direct forward or backward action of the fifth wheel.

4 Claims, 3 Drawing Sheets

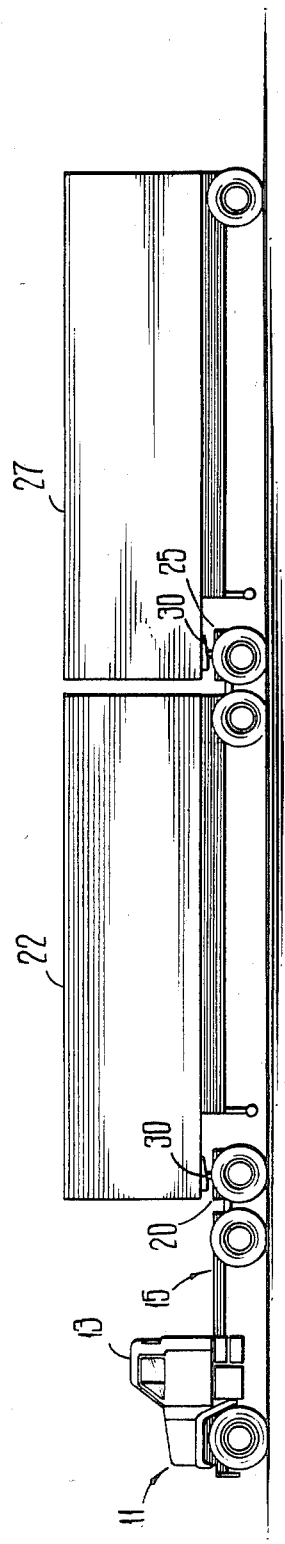
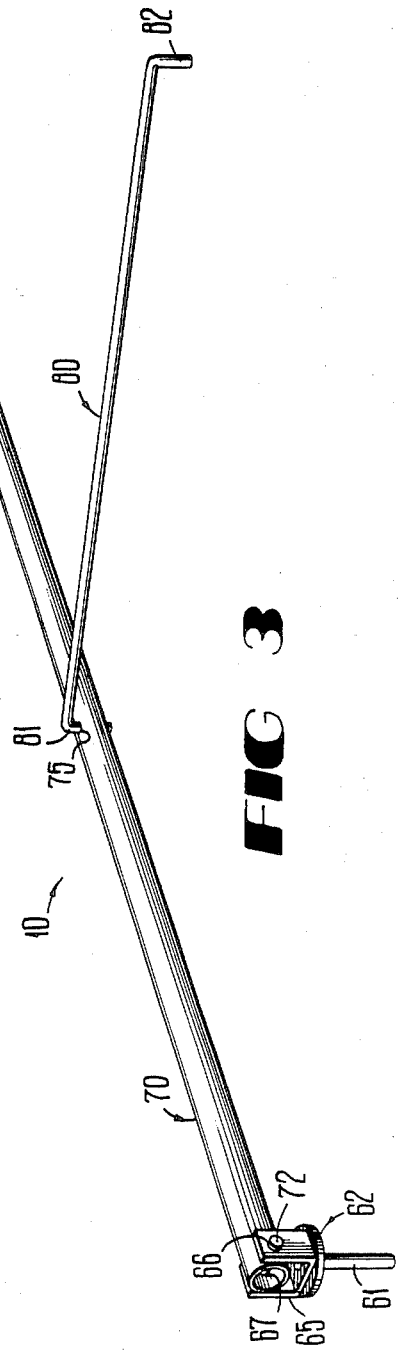

TOOL FOR MOVING A FIFTH WHEEL

TECHNICAL FIELD

The present invention relates generally to tractor trailer trucks and, more particularly, relates to adjusting the position of a fifth wheel on a tractor trailer truck.

BACKGROUND OF THE INVENTION

As a direct result of deregulation, the commercial trucking industry has become highly competitive. With the advent of such competition in this industry, competitors are attempting to maximize their utilities of both equipment and materials. For example, it is now common place for a single truck to pull two trailers. This dual-trailer arrangement saves on fuel and wear and tear on the truck itself. For similar reasons, a smaller trailer may be utilized in place of a larger standard sized trailer where economically advantageous.

Regardless of the number of trailers or the size of a trailer, it is common to the trailer to connect to the truck by means of a "jifflock" assembly that includes a "fifth wheel". The "jifflock" is an interlocking assembly that is connected to the rear of the truck and extends rearwardly to engage the trailer. The fifth wheel, which initially rests immediately behind the cab, is a mounting member that is moved about the back end of the truck or onto the "jifflock" for connection of the trailer to the "jifflock". The assembly is referred to in the trade as a "jifflock" since it is manufactured and sold by Topco, Inc. of Toledo, Ohio under this trademark. Those skilled in the art will appreciate that the fifth wheel is that portion of the mounting assembly that provides for the pivotal action of the trailer relative to the truck. Such individuals will further appreciate that both the interlocking or interconnecting assembly and the fifth wheel mounting assembly are conventional and well known in the industry.

Depending on the arrangement of the trailer or trailers, or upon the size of the trailer to be pulled, the fifth wheel is moved to a selected position about the truck or the interconnecting assembly. It is typically the responsibility of the driver to prepare the truck for transport of a different sized or more than one trailer. Because the fifth wheel must be secured in different positions to facilitate receipt of different sized trailors, and because it is difficult to move a fifth wheel due to its weight and inaccessibility, truck drivers have devised certain prior art methods of moving the fifth wheel.

One such prior art method is the provision of a straight pull bar. To use this tool, the driver stands behind or climbs upon the interlocking assembly and attempts to pull the fifth wheel directly back off the truck and onto the interconnecting assembly. To return the fifth wheel to its original position, the driver stands with his back against the back of the cab and, again, pulls directly towards him. This prior art method has proven unacceptable for several reasons. The rearward portion of the truck and the interconnecting assembly are both constructed with open spaces between component parts of their frames. The driver standing upon the frame either incurs a significant risk of accidentally falling or stepping into one of the open spaces and suffering injury. In fact, such injuries are well known amongst truck drivers. Furthermore, the fifth wheel can often be difficult to move because of its weight and because of the driver being unable to establish a strong working position from which to push on or pull the fifth wheel.

As a result of these and other deficiencies with the straight pull bar, yet another prior art method for moving the fifth wheel has been devised. This second prior art method consists of utilizing the forward or backward movement of the truck to effect movement of the fifth wheel. For example, if it is desired to move the fifth wheel forward from the interconnecting assembly to the truck, the driver accelerates the truck to approximately 10 or 15 miles per hour and then forcefully depressed the brakes. While the effect of this action is to stop the truck, the fifth wheel continues at such speed and is moved forward from the jifflock to the truck. Of course, to move the fifth wheel backwards, the same operation is repeated but in the other direction.

This second prior art method of adjusting the fifth wheel is also unacceptable. In moving the fifth wheel from the interconnecting assembly to the cab, it is common for the fifth wheel to slam into the rear of the cab housing, causing damage thereto. In fact, unless the driver is very adept at this second method, this is the only way to stop the fifth wheel from moving forward. Furthermore, when moving the fifth wheel backward from the truck to the interconnecting assembly by this second method, it is common for the fifth wheel to be thrown from the jifflock because there is no rearward stop to prevent the fifth wheel from coming off the interconnecting assembly. To correct this problem, many truck drivers have placed pins in the sliding platform, but it is known for such pins to break or come loose. Of course, the second prior art method of moving a fifth wheel also causes damage to both the fifth wheel and the interconnecting assembly.

Thus, there exists a need in the prior art for a method of moving the fifth wheel about the truck assembly in a manner that is both safe and efficient.

SUMMARY OF THE INVENTION

The present invention solved the above-described problems in the prior art by providing a tool for moving the fifth wheel. The tool is constructed so that the driver stands on the ground to the side of the truck when moving the fifth wheel. Thus, the tool substantially eliminates the potential for driver injury. The tool is further designed so as to provide a straight pulling motion of the fifth wheel while permitting the driver to accomplish such pulling motion by means of leveraged extension. This permits the driver to quickly and easily move the fifth wheel, as described in detail hereinbelow.

Generally described, a tool for moving a fifth wheel according the present invention comprises a pivotable leverage arm that extends across the width of the cab assembly and a pivotal pull bar attached thereto. The leverage arm is pivotably secured to the platform upon which the fifth wheel slides, and the pull bar is pivotally secured to the fifth wheel itself.

Described somewhat more particularly, a tool for moving the fifth wheel according to the present invention comprises a pin for extension through an existing opening platform upon which the fifth wheel slides, a leverage arm fixedly attached to the pin so as to rotate therewith, the leverage arm extending at least the width of the rear portion of a truck cab, a pull bar pivotally secured to the leverage arm having one end thereof configured for hooking engagement to the fifth wheel.

In use of the present invention, the pin is placed in a selected existing opening in the platform upon which the fifth wheel conventionally slides. The free end of the pull bar is then engaged to the fifth wheel. The user of the tool walks to the free end of the leverage arm, and carries that end of the leverage arm in the direction in which the fifth wheel is to be adjusted. The effect of this action is to engage the free end of the pull bar to the fifth wheel and to pull the fifth wheel in that direction. If it is desired to further move the fifth wheel, the pin to which the leverage arm is attached is simply removed from the opening in which it was first placed, and likewise placed in a second selected opening. The act of carrying the free end of the leverage arm in the direction in which it is desired to move the fifth wheel is then repeated.

Thus, it is an object of the present invention to provide a tool for moving a fifth wheel about a conventional tractor trailer assembly.

It is a further object of the present invention to provide a tool for moving a fifth wheel that substantially eliminates injury to the driver when performing such operation.

It is a further object of the present invention to provide a tool for moving a fifth wheel that eliminates the need for climbing upon either the cab or the interconnecting assembly secured thereto.

It is a further object of the present invention to provide a tool for moving a fifth wheel that eliminates the prior art method of moving the fifth wheel through rapid stop of the cab, and the associated maintenance and repair costs.

It is a further object of the present invention to provide a relatively inexpensive tool for moving a fifth wheel.

It is a further object of the present invention to provide a tool for moving a fifth wheel that is durable and of lightweight construction.

It is a further object of the present invention to provide a tool for moving a fifth wheel whereby the individual moving the fifth wheel need not climb onto either the cab or the interconnecting assembly attached thereto.

It is a further object of the present invention to provide a tool for moving a fifth wheel that permits such a move to be accomplished by only one individual.

These and other objects, features and advantages of the present invention will become apparent from reading the following specification as taken in conjunction with the accompanying drawings.

BRIEF DESCRIPTION OF THE DRAWINGS

FIG. 1 is a diagrammatic view of a tractor truck pulling dual trailers.

FIG. 3 is a perspective view of a preferred embodiment of a tool in accordance with the present invention.

DETAILED DESCRIPTION

Figure 2:
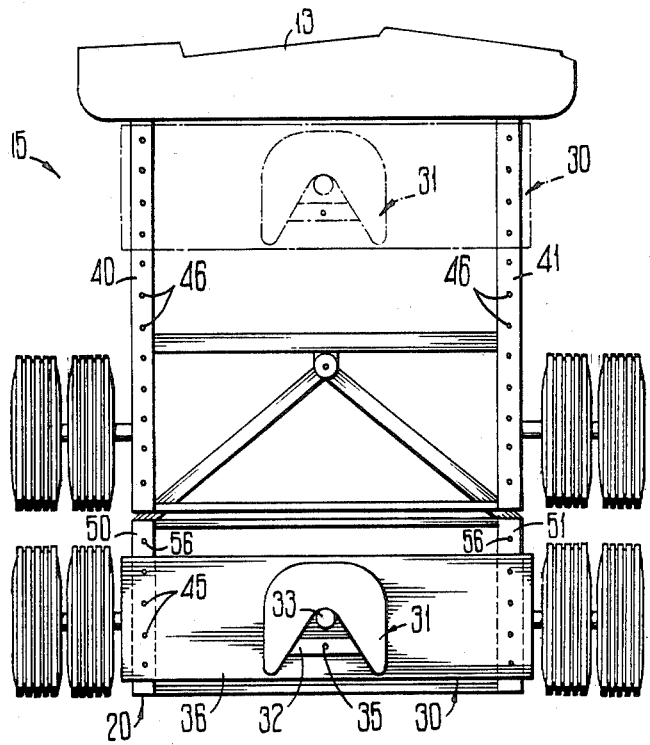
FIG. 2 is a top schematic view of the back of a conventional truck showing a jifflock interlocking assembly connected thereto.

Referring now in more detail to the drawing, in which like numerals indicate like parts throughout the several views, the preferred embodiment of the tool for moving a fifth wheel of the present invention, is shown at 10 throughout the various drawings. FIG. 1 shows a truck 11 having a cab 13 and a rearwardly extending trailer mounting portion 15. Connected to the back of the trailer mounting portion 15 of the truck 11 is an interconnecting assembly 20, commonly referred to in the trade as a "jifflock". Such connection is well known in the art and beyond the scope of the present invention.

FIG. 1 further shows a trailer 22 attached to the assembly 20. Connected at the rear of the trailer 22 is a second "jifflock" interconnecting assembly 25. A second trailer 27 is connected to the rear of this second interconnecting assembly 25. Those skilled in the art will recognize such connection to be conventional and, to be conventionally accomplished through the use of a fifth wheel indicated generally at 30. The fifth wheel projects upwardly of the rearward mounting portion of the cab 13, the front "jifflock" assembly 20 and the rear "jifflock" assembly 25. The fifth wheel so projects so as to facilitate pivotable mounting of the respective trailers 22 and 27 upon the interconnecting assemblies 20 and 25.

FIG. 2 shows a top view of the rearward mounting portion 15 of the cab 13 and the interconnecting assembly 25 connected thereto. FIG. 2 is a diagrammatic view and shows only that portion of the truck and trailer assembly pertinent to explanation of the present invention. It is to be noted that the fifth wheel 30 includes a mounting wheel portion 31 and an interconnecting portion 32. The mounting wheel portion 31 is characterized by an indented rear section bridged by the interconnecting portion 32. At the most indented area thereof, a pin 33 is provided that facilitates pivotal attachment of the trailer to the conventional fifth wheel in the conventional manner. It is to be further noted that an opening 35 is provided at the center of the bridge 32. This opening is a typical component of a conventional fifth wheel.

The fifth wheel 30 further includes a base plate 36. The base plate 36 extends between two platforms 40 and 41 that are a portion of the truck 11. At its outer ends, the plate 36 is provided with a plurality of spaced openings 45. Similarly, each sliding platform 40 and 41 is also provided with a plurality of openings 46 that are substantially identically spaced.

The forward interconnecting assembly 20 is attached to the rear portion of the cab 13 in the conventional manner. It is to be noted that the assembly 20 includes sliding platforms 50 and 51 that are in alignment with the truck mounted sliding platforms 40 and 41 described hereinabove. The sliding platforms 50 and 51 are formed in a similar manner, having openings 56 spaced apart one from the other in a manner identical to that of the openings 46 in platforms 40 and 41 and the opening 45 in the platform 36.

FIG. 3 shows, in isolation, the preferred embodiment of a tool in accordance with the present invention. The tool 10 is comprised of a mounting pin 61 that is formed integrally with and extends downwardly of a pivot plate 62. A U-shaped mount 65 is fixedly attached to the top of the pivot plate 62. The mount 62 is characterized by a pair of openings 66 and 67 defined in the vertical walls thereof. The mount 65 is dimensioned for receipt of one end of a leverage arm 70. This end of the leverage arm is provided with a pair of openings (not shown) that, upon receipt of the leverage arm 70 in the mount 65, are in alignment with the openings 66 and 67. To secure the leverage arm 70 within the mount 65, a pin 72 is inserted through the openings 66 and 67 in the mount and the corresponding openings in the leverage arm 70. The leverage arm, which is shown as a hollow cylindrical member, is of a length sufficient to extend from one platform 40 or 41 of the cab assembly across to the other platform 40 or 41 and beyond. Intermediate the ends of the leverage arm 70, a mounting aperture 75 is provided. The aperture 75 extends the height of the arm 70 and is of sufficient dimension for receipt of a pull bar 80. The pull bar 80 is shown as an elongate member having hooked end portions 81 and 82. End portion 81 is received by the mounting aperture 75. Although securely retained therein, the end 81 of the pull bar 80 freely rotates within the mounting aperture 75 of the leverage arm 70. Such retention of the hook end portion 81 within the mounting aperture 75 may be accomplished in any conventional manner. The other end portion 82 of the pull bar 80 is dimensioned and configured for receipt by the opening 35 in the bridge 32 of the fifth wheel 31.

Figure 4:
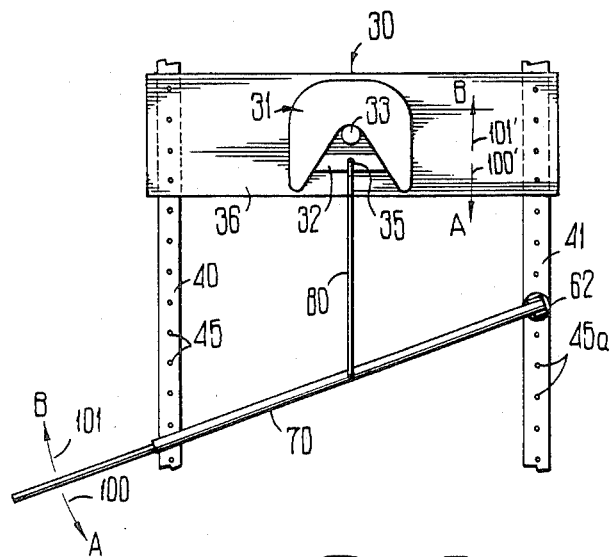
FIG. 4 is a top diagrammatic view showing operation of the tool in FIG. 3 as used to slide the fifth wheel as shown in FIG. 2.

Operation and use of the present invention is demonstrated by FIG. 4. The fifth wheel assembly 30 is shown as typically provided upon the platforms 40 and 41. In keeping with the present invention, the mounting pin 61 of the tool 10 has been inserted in a first selected opening 45 in platform 41. In like manner, the hooked end portion 82 of the pull bar 80 has been inserted into the opening 35 of the bridge 32 and the fifth wheel 31. If it is desired to move the fifth wheel 30 rearward, such direction being indicated by the letter "A", the free end of the leverage arm 70 is moved rearwardly as indicated by the arrow 100 and the designating "A". This action will cause the pull bar to be pulled directly rearward as it pivots within mounting opening 75 of the leverage arm 70.

If it is desired to move the fifth wheel forward, such direction being indicated in the drawing by the letter "B", the free end of the leverage arm 70 is simply pushed in the forward direction as indicated by the arrow 101 and the letter "B". In a manner substantially identical to that described hereinabove for moving the fifth wheel 30 in the rearward direction, the push/pull bar 80 exerts a direct forward force against the fifth wheel as it pivots within the mounting aperture 75 of the leverage arm 70.

Figure 5:
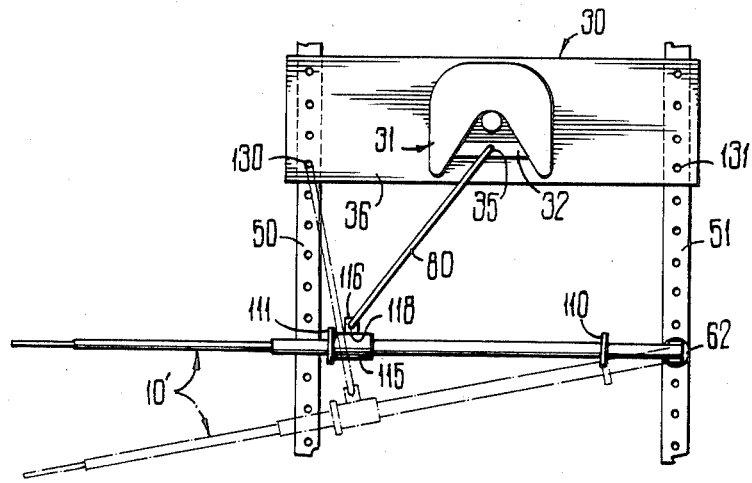
FIG. 5 is a top diagrammatic view showing operation of a second preferred embodiment of a tool for moving a fifth wheel according to the present invention.

FIG. 5 shows a second embodiment of a tool according to the present invention and its use in freeing a stack fifth wheel. Referring to FIG. 5, the leverage arm 70 is fitted with a pair of ring-like stop members 110 and 111. The stop members are spaced apart one from the other about the center point of the arm 70. A slidable sleeve 115 is fitted about the arm 70 and is placed between the stops 110 and 111. The sleeve 115 includes a projecting portion 116 integrally formed therewith that receives the push/pull bar 80.Thus, the projection 116 is provided with an aperture 118 that receives the hooked end 81 of the bar 80.

Figure 5A:
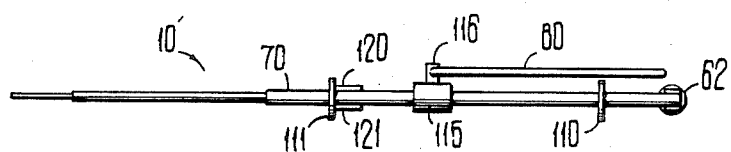
FIG. 5A is a front plan view showing the second embodiment of FIG. 5 in a collapsed position.
Figure 5B:
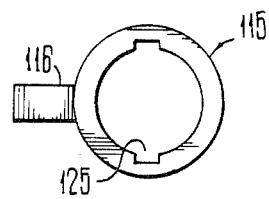
FIG. 5B is an end view of the sleeve member of the embodiment shown in FIG. 5.

It is to be understood that the sleeve 115 slides upon the leverage arm 70 between the stop members 110 and 111. This movement is regulated by key-like projections 120 and 121 of the leverage arm 70. As shown in FIG. 5A and FIG. 5B, the interior portion of the sleeve 115 is formed with a protruding cavity 125 that, upon proper orientation of the sleeve 115, by moved past either of the projections 120 or 121.

FIG. 5 shows use of the second embodiment 10' in the manner as described above and as used to free a stuck fifth wheel 30. It is to first be noted that the plate 36 is provided with two side apertures 130 and 131. The bar 80 is secured at one end 81 to the sleeve 115 as described above. The other end 82 of the bar 80 is placed within the side aperture 130. The sleeve 115 has been moved past the key projections 120 and 121. To move the fifth wheel assembly 30 in the usual manner using this second embodiment, the driver simply manipulates the leverage arm 70 described above. However, should the fifth wheel assembly 30 become stuck, the driver may remove the bar 80 from the aperture 35 of the fifth wheel bridge 32, and insert it in the aperture 130 (or 131) to exert a pull on one side of the assembly 30. This is shown by the dashed lines in FIG. 5. Once the fifth wheel assembly 30 is free, the end 82 of the bar 80 is removed from aperture 130 and placed in the usual opening 35 as described hereinabove.

The novel construction of the present invention provides many advantages over prior art methods and tools. There is no need for the driver to actually climb onto either the truck or the jifflock for the purpose of moving the fifth wheel. This substantially eliminates any potential injury to the driver as a result of this operation. Furthermore, there is no need for the driver to operate the truck at all in order to move the fifth wheel. This solves any problem of damage to the cab or of loss of a fifth wheel due to movement of the fifth wheel through such a prior art method as described hereinabove. The present invention further takes advantage of the leverage arm and its function to provide an easy and quick method of moving the fifth wheel. In tests, the most difficult operation of moving the fifth wheel has been performed by a wide variety of individuals without exertion of the usual stress or strength.

It should be understood that the foregoing only relates to a preferred embodiment of the present invention and that numerous modifications or alterations may be made therein without departing from the spirit and scope of the invention as set forth in the appended claims. For example, the free end of the leverage arm 70 may be provided with a telescopic handle. Such a handle would provide for an extension member to be retrieved therefrom in the event that a fifth wheel should be jammed or very difficult to move. The free end of the leverage arm 70 could also be provided with a mounting pin or the like that could be used to assist the driver in moving the fifth wheel from the mounting portion of the cab to the jifflock. For example, it is not unusual for the platforms 50 and 51 to the jifflock to be positioned somewhat higher than the platforms 40 and 41 of the cab. When this condition occurs, it is often necessary to raise the back portion of the sliding platform 36 of the fifth wheel assembly 30 so as to engage the jifflock platforms 50 and 51. A crow bar like pin or the like may be secured within the free end of the leverage arm 70 to assist in such operation.

I claim:

1. A tool for moving a fifth wheel on a tractor trailer truck and an interconnecting assembly connected thereto, said tractor trailer truck including a pair of substantially parallel platforms extending rearwardly of said truck, said platforms being spaced apart one from the other and each including a plurality of spaced apart apertures, said interconnecting assembly including a pair of substantially parallel platforms in substantial alignment with said truck pair of parallel platforms, said interconnecting assembly pair of platforms being spaced apart one from the other and each including a plurality of spaced apart apertures, and said fifth wheel being slidably mounted upon one of said substantially parallel platforms of said truck and said interconnecting assembly, said tool comprising:

- a first arm member, said first arm member being of sufficient length to extend at least a perpendicular distance between said substantially parallel platforms of said truck and said interconnecting assembly;
- a pin attached to one end of said first arm member, said pin being suitable for insertion into a selected aperture of one of said truck platforms and said interconnecting assembly platforms such that said first arm member is rotatable about said selected aperture; and
- a second arm member defining a first end and a second end, said first end of said second arm member being pivotally connected to said first arm member and said second end of said second arm member being engaged to said fifth wheel,
- whereby rotational movement of said first arm causes said second arm to effect linear movement of said fifth wheel.

2. The tool of claim 1 wherein said second arm member is pivotally secured to said first arm member at the approximate center of said first arm member.

3. The tool of claim 1 further comprising a slidable sleeve mounted upon said first arm member such that said second arm member is pivotally connected to said sleeve.

4. A tool for moving a fifth wheel mounted upon a tractor trailer truck having a trailer mounting assembly extending rearwardly thereof, said trailer mounting assembly including two sliding platforms, each being formed with a plurality of apertures spaced apart one from the other, said fifth wheel being slidably mounted upon said platforms of said trailer mounting assembly of said truck, a trailer adapted to be pulled by said truck, and an interconnecting assembly for connecting said trailer to said truck, said interconnecting assembly including two sliding platforms, each being formed with a plurality of apertures spaced apart one from the other, said sliding platforms of said interconnecting assembly being substantially aligned with said sliding platform of said trailer mounting assembly of said truck, said tool comprising:

a first arm member of sufficient length to extend from one of said sliding platforms of said truck to the other of said sliding platforms of said truck, said first arm member including means for rotating said first arm member about one of said apertures of said sliding platforms, and a second arm member pivotally attached to said first arm member, said second arm member including means for securely engaging said fifth wheel so as to affect movement thereof, whereby forward and backward rotational movement of said first arm member affects movement of said fifth wheel in a corresponding forward and backward direction along said sliding platforms.

* * * * *